United States Patent
Cojande et al.

(10) Patent No.: US 10,221,692 B2
(45) Date of Patent: Mar. 5, 2019

(54) TURBINE ENGINE GUIDE VANE (71) Applicant: SAFRAN AIRCRAFT ENGINES, Paris (FR)

(72) Inventors: Pradeep Cojande, Moissy-Cramayel (FR); Eric Pierre Maurice Lippinois, Moissy-Cramayel (FR); Hanna Reiss, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 183 days.

(21) Appl. No.: 14/911,626

(22) PCT Filed: Aug. 4, 2014

(86) PCT No.: PCT/FR2014/052027
§ 371 (c)(1),
(2) Date: Feb. 11, 2016

(87) PCT Pub. No.: WO2015/022463
PCT Pub. Date: Feb. 19, 2015

(65) Prior Publication Data
US 2016/0194962 A1 Jul. 7, 2016

(30) Foreign Application Priority Data
Aug. 12, 2013 (FR) ...................... 13 57956

(51) Int. Cl.
*F01D 5/14* (2006.01)
*F01D 9/04* (2006.01)
*F04D 29/54* (2006.01)

(52) U.S. Cl.
CPC ............ *F01D 5/141* (2013.01); *F01D 9/041* (2013.01); *F04D 29/544* (2013.01); *Y02T 50/673* (2013.01)

(58) Field of Classification Search
CPC ...................................................... F01D 5/141
See application file for complete search history.

(56) References Cited

U.S. PATENT DOCUMENTS

| 4,208,167 A | 6/1980 | Yasugahira et al. |
| 7,497,664 B2 * | 3/2009 | Walter .................... F01D 5/141 416/223 A |

(Continued)

FOREIGN PATENT DOCUMENTS

| EP | 1 983 160 A2 | 10/2008 |
| GB | 2 004 599 A | 4/1979 |

OTHER PUBLICATIONS

International Search Report dated Dec. 23, 2014 for PCT/FR2014/052027 filed on Aug. 4, 2014.

(Continued)

Primary Examiner — Justin Seabe
(74) Attorney, Agent, or Firm — Oblon, McClelland, Maier & Neustadt, L.L.P.

(57) ABSTRACT

An outlet guide vane for a turbine engine, the vane having a plurality of vane sections stacked along a radial axis Z. Over a bottom portion of the vane in the range 0 to 50% of its total height, the leading edge of each section is in front of the leading edge of the corresponding section at the total height, and the maximum thicknesses are located at positions that are offset from the leading edge by at least 50% of the chord.

15 Claims, 5 Drawing Sheets

(56) References Cited

U.S. PATENT DOCUMENTS

| | | | | |
|---|---|---|---|---|
| 8,057,188 B2* | 11/2011 | Parker | ............... | F01D 5/141 |
| | | | | 416/223 A |
| 8,087,884 B2* | 1/2012 | Wood | ............... | F01D 5/141 |
| | | | | 415/191 |
| 2005/0008494 A1* | 1/2005 | Tsuchiya | ............ | F01D 5/141 |
| | | | | 416/241 R |
| 2008/0253885 A1 | 10/2008 | Foose et al. | | |
| 2010/0209235 A1 | 8/2010 | Shim et al. | | |

OTHER PUBLICATIONS

Japanese Office Action dated May 22, 2018 in Patent Application No. 2016-533938 (Submitting English translation only) 3 pages.

\* cited by examiner

TURBINE ENGINE GUIDE VANE

BACKGROUND OF THE INVENTION

The invention relates to a turbine engine guide vane, to an annular set of turbine engine guide vanes, and to a turbine engine including such a set of guide vanes.

Figure 1:
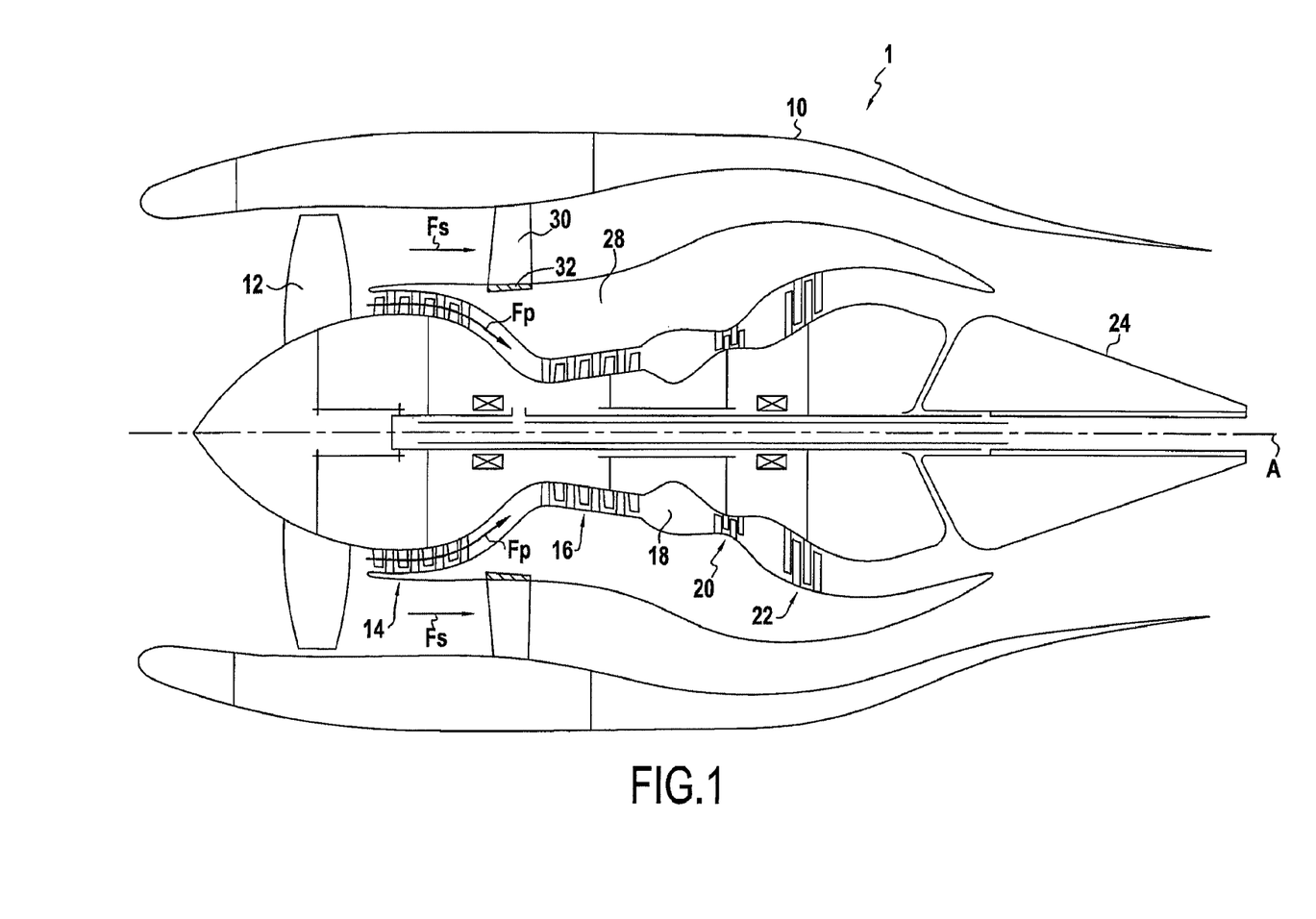
FIG. 1, described above, is a diagrammatic view in longitudinal section of a turbine engine.

A bypass turbine engine 1 for propelling an aircraft is shown in FIG. 1, in section in a vertical plane containing its main axis A. The turbine engine comprises an outer casing 10 containing, from upstream to downstream in the air flow direction: a fan 12; a low pressure compressor 14; a high pressure compressor 16; a combustion chamber 18; a high pressure turbine 20; a low pressure turbine 22; and an exhaust cone 24.

An inner casing 28 is arranged inside the outer casing 10 around the compressors 14 and 16 around the combustion chamber 18, and around the turbines 20 and 22. An annular set 30 of outlet guide vanes extends downstream from the fan 12 between the casings 28 and 10, specifically being located in the region of the compressors 14 and 16.

In operation, the inner casing 28 splits the stream of air accelerated by the fan 12 into a primary stream Fp that feeds the compressors 14 and 16 and a secondary stream Fs that flows between the casings 28 and 10 and that is therefore ejected from the engine after passing through the set 30 of outlet guide vanes in order to supply a portion of its thrust.

The outlet guide vanes (OGVs) comprise a plurality of vanes arranged in an annulus around a ring 32 carried by the inner casing 28. The guide vanes serve to straighten out the flow of air leaving the fan.

For better efficiency of the outlet guide vanes, they need to have good aerodynamic performance, and in particular they need to limit losses on passing through the annulus they form.

Furthermore, under the effect of the air stream, the guide vanes are subjected to high levels of stress, thereby leading in particular to phenomena of the vanes twisting and bending. A vane twisting suffers deformation around its own stacking axis. A vane bending suffers deformation about the tangential axis that is tangential to the rotation of the fan, and thus to the ring 32.

These twisting and bending phenomena are analyzed by the twist bend coupling (TBC) parameter. The TBC parameter at a point of a vane is the ratio between the amplitude of twisting and the amplitude of bending at that point. The TBC parameter of outlet guide vanes reveals their tendency to float in operation. It must be acceptable from the point of view of operability of the turbine engine and from the point of view of its aerodynamic behavior.

It is therefore important to ensure that the increasing efficiency in aerodynamic performance does not degrade the TBC parameter relative to a target TBC parameter, as determined during a stage of calculating the dimensions of the turbine engine.

OBJECT AND SUMMARY OF THE INVENTION

The invention seeks to propose a guide vane that makes it possible both to encourage a good distribution of the air stream past the vanes, with increased aerodynamic performance, and also to avoid degrading the behavior of the vanes in terms of twisting and bending, compared with conventional vanes.

The invention provides a guide vane for a set of guide vanes of a turbine engine, the guide vane comprising a plurality of vane sections stacked between a root and a tip along a radial axis Z that defines the height direction of the vane, each vane section:

extending along a longitudinal axis X between a leading edge and a trailing edge, and along a tangential axis Y between a pressure side face and a suction side face;

having a chord defined by the length of the segment extending from the leading edge to the trailing edge; and having a thickness defined by the distance between the pressure side and suction side faces that varies along the chord;

dimensionless coordinates x' and z' being defined for each point of the vane of coordinates x, y, and z along the axes X, Y, and Z by the quotients x/Ht and z/Ht, where Ht represents the total height of the vane, the leading edge of the vane at its total height Ht defining a coordinate at the origin x'=0 from which the coordinate x' increases going towards the trailing edge;

the vane being characterized in that over a bottom portion of the vane extending from z'=0 to z'=0.5, the coordinate x' of the leading edge is negative and the maximum thicknesses are located at positions that are offset from the leading edge by at least 50% of the chord.

Thus, the leading edge of the vane projects forwards over the bottom portion of the vane, in other words over its bottom portion the leading edge extends upstream from its position at the radially outer end of the vane, which is where the total height of the vane is measured. As explained below, this provides a better distribution of the flow of air over the height of the vane. Simultaneously, over the bottom portion, the zones of maximum thickness of the various vane sections are offset away from the leading edge, thereby making it possible to limit twisting phenomena, and in particular bending phenomena of the vane.

In other variants, the vane presents one or more of the following characteristics:

for the section of coordinate z'=0, the coordinate x' is less than or equal to −0.15;

the coordinate x' is less than or equal to −0.1 over a portion of the vane going from z'=0 to z'=0.3;

the coordinate x' increases continuously over the bottom portion of the vane with increasing coordinate z';

for the section of coordinate z'=0, the maximum thickness is located at a position offset from the leading edge by at least 60% of the chord;

the maximum thickness is located at a position that is offset from the leading edge by at least 60% of the chord over a portion of the vane extending in the range z'=0 to z'=0.15; and the vane presents a first portion close to its root over which the position of the maximum thickness relative to the chord remains substantially constant, and a second portion extending beyond the first portion to the tip of the vane, over which the position of the maximum thickness advances towards the leading edge.

BRIEF DESCRIPTION OF THE DRAWINGS

The invention can be well understood and its advantages appear better on reading the following detailed description of an embodiment shown by way of non-limiting example. The description refers to the accompanying drawings, in which.

DETAILED DESCRIPTION OF THE INVENTION

Figure 2:
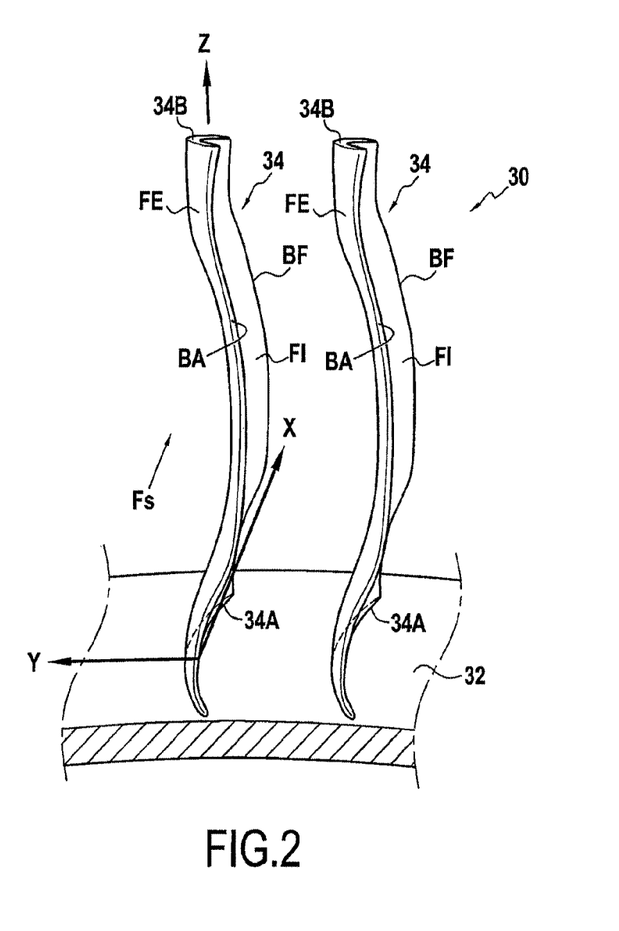
FIG. 2 is a fragmentary diagrammatic view of the OGVs of the engine.

FIG. 2 shows a portion of the annular set 30 of OGVs of the turbine engine shown diagrammatically in FIG. 1. This set comprises a plurality of vanes 34 that are fastened via their roots 34A to the casing 28 via the ring 32, and that are fastened via their tips 34B to the casing 10 (not shown in the figure). The root and the tip are respectively the radially inner end and the radially outer end of a vane, between which there extends the aerodynamic profile (airfoil) of the vane.

FIG. 2 shows the X, Y, Z orthogonal reference frame, where the axis X is the longitudinal axis parallel to the main axis A of the turbine engine, which is the axis of rotation of the turbines, the axis Y is the tangential axis, and the axis Z is the radial axis, defining the height direction of the vanes.

Each vane presents a leading edge BA and a trailing edge BF that are spaced apart along the axis X, and also a suction side face FE and a pressure side face FI.

Figure 3:
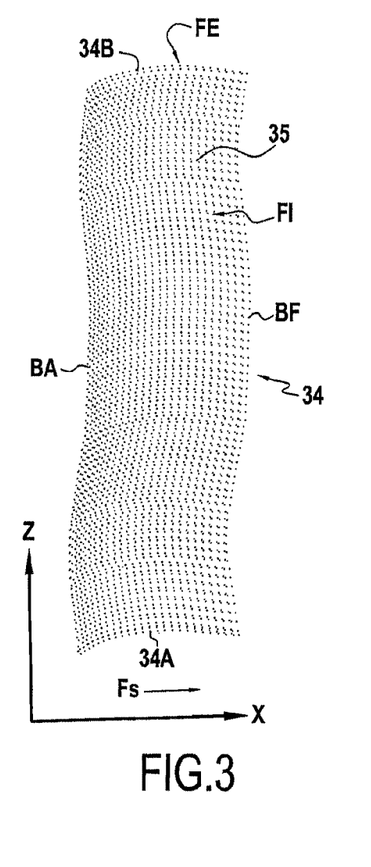
FIG. 3 is a view of a single OGV, showing how the sections of the vane are stacked.

As can be seen in FIG. 3, each vane 34 is made up of a plurality of vane sections 35 stacked along the axis Z, from the root 34A to the tip 34B.

Figure 4:
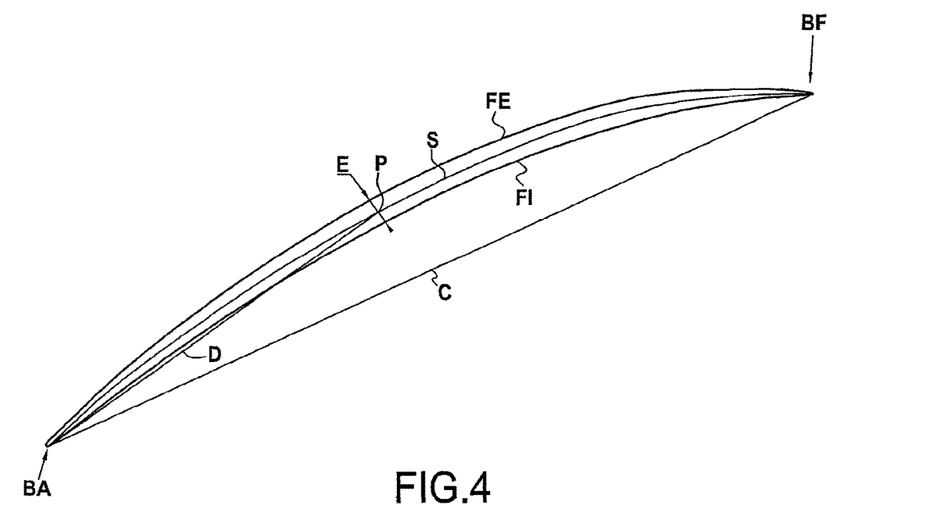
FIG. 4 is a section of the vane in one of its sections.

The section of FIG. 4 constitutes one of those sections in a plane at constant Z. In this section, there can be seen the chord C of the vane, which is the rectilinear segment extending between the leading edge BA and the trailing edge BF. By convention, travel along this segment is in the direction going from the leading edge towards the trailing edge. In FIG. 4, the thickness E of the vane is marked in a middle region of the section. By convention, this thickness E is the distance between the pressure side face FI and the suction side face FE located at a position of the vane section defined by a point P of its skeleton S, perpendicularly to the skeleton, where the skeleton is the middle line between the pressure side face FI and the suction side face DE. Thus, the thickness E is measured at a position offset from the leading edge BA by a distance D. The position of the maximum thickness, defined as a percentage of the length of the chord C is thus defined by 100×D/C.

It should be understood that FIGS. 2 to 4 are provided to facilitate understanding of the overall structure of the guide vanes and of the set of vanes. These figures do not necessarily illustrate the dimensional criteria specific to the invention, relating in particular to the position of the leading edge and to the position of the maximum thickness.

Figure 5:
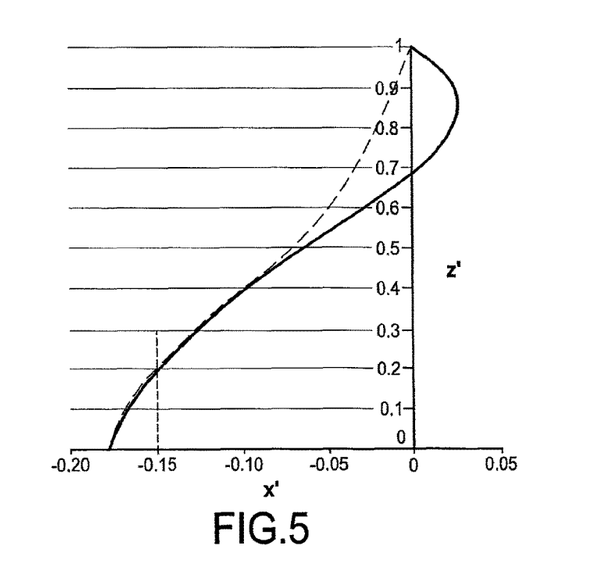
FIG. 5 is a curve showing how the position of the leading edge of the vane varies along its height.

The continuous line curve shown in FIG. 5 is the trace of the leading edge, i.e. the curve showing how the X position of the leading edge of the vane varies along its height (the Z direction). This curve is plotted with coordinates x' along the X axis given by x/Ht, i.e. the coordinate x of the point under consideration of the leading edge BA along the X axis, as expressed dimensionlessly relative to the total height Ht of the vane, and the coordinates z', given by z/Ht, i.e. the coordinate z of the point under consideration of the leading edge along the axis Z, as expressed dimensionlessly relative to the height Ht. The coordinate at the origin, z=0 or z'=0 is defined by the root of the vane, i.e. at the level of the outer periphery of the ring 32. The total height Ht is measured from the root to the tip of the vane. The coordinate at the origin, x'=0 is defined as being the coordinate x' of the leading edge at the point z'=1, i.e. at the point of maximum height. The coordinate x' increases going towards the trailing edge along the axis X in FIG. 2.

It can be seen that the vane projects forwards throughout its bottom region. Specifically the coordinate x' remains negative throughout the bottom half of the height of the vane, referred to as its "bottom portion" extending from the root 34A up to 50% of the total height Ht (z'=0.5). In the example shown, the coordinate x' is about −0.07 at z'=0.5.

It can also be seen that for z'=0, x' is less than −0.15, and more particularly it is about −0.175. Furthermore, over the entire part of the bottom portion extending in the range z'=0 to z'=0.3, the coordinate x' remains less than or equal to −0.1.

In the example shown, the coordinate x' increases continuously from the root, passes through a value of zero at about ⅔ of the height of the vane and reaches a maximum positive value at about 80% to 90% of the total height, prior to decreasing and returning to zero at 100% of the maximum height.

In a variant shown by the discontinuous-line curve, this final stage of decrease can be omitted, in which case the coordinate x' increases continuously from the root to reach a value of zero or substantially zero at 100% of the maximum height.

The curve of FIG. 5 is characterized in particular by projecting forwards up to 50% of the total height. The inventors have found that for guide vanes presenting such a forward projection, aerodynamic losses are limited compared to a conventional vane having a straight stack, i.e. a stack in which the coordinate x' of the leading edge is substantially constant over its total height.

Figure 8:
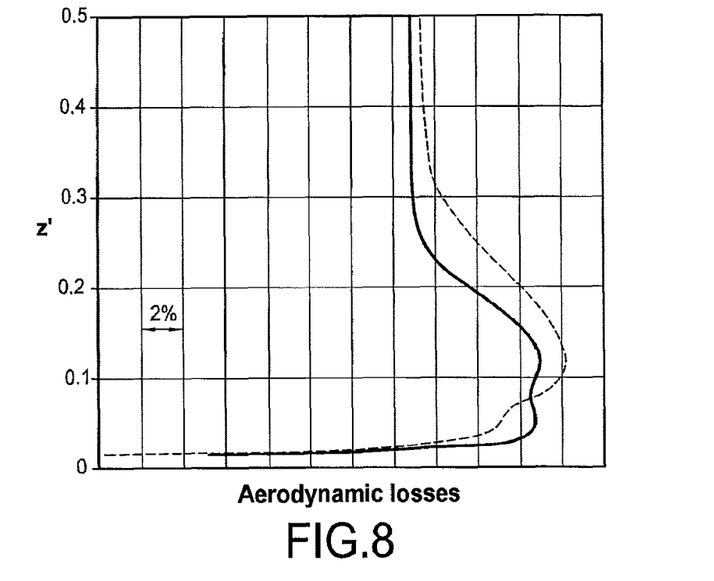
FIG. 8 shows how air pressure losses on going past a vane vary along the height of the vane, both for a vane of the invention (continuous lines) and for another guide vane (discontinuous lines)

This can be seen in particular in FIG. 8, which plots variation in aerodynamic losses (along the abscissa axis) as a function of the coordinate z' (up the ordinate axis). This variation is shown for the bottom portion of the vane, up to z'=0.5, firstly for a vane presenting such a forward projection (continuous line) and secondly for a vane having a straight stack (discontinuous line). There can be seen in particular that there is a very substantial improvement starting from about 8% of the total height (z'=0.08), which is of the order of 1% to 2% on average over the entire bottom portion.

In order to optimize the behavior of the vane having such a forwardly projecting portion, the inventors have observed that it is advantageous to move back the position of the maximum thickness towards the trailing edge in the bottom portion of the vane. This enhances the behavior of the vane in twisting and bending. The positions of the maximum thicknesses of the various sections are determined in percentages of the chord length.

Figure 6:
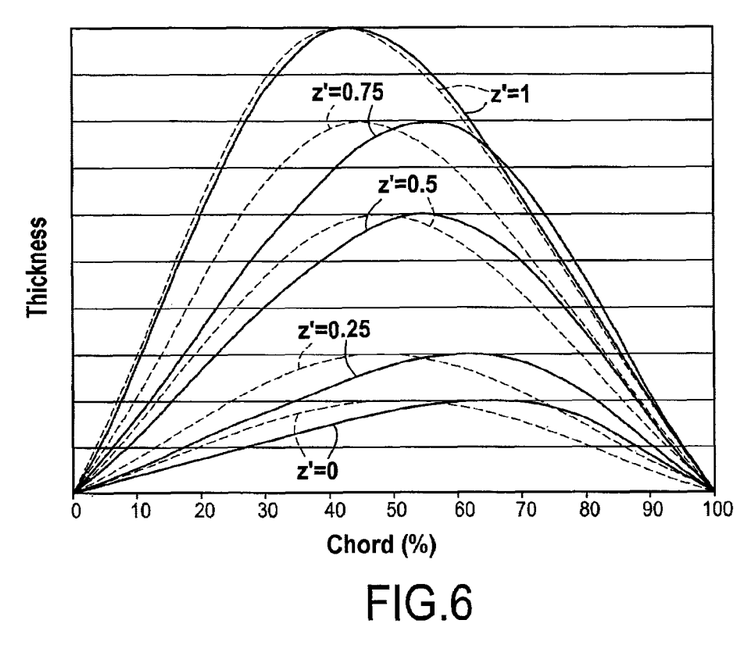
FIG. 6 shows the distribution of thicknesses along the chord for different sections of the vane, both for a vane of the invention (continuous lines) and for another guide vane (discontinuous lines)

In this respect, FIG. 6 shows how the positions of maximum thickness vary as a function of height. Both for the vane of the invention (continuous line) and also for a vane having a similar forward projection but with conventional positions for maximum thickness (discontinuous lines), FIG. 6 shows five curves for variation in vane thickness, respectively for the sections $z'=0$, $z'=0.25$, $z'=0.5$, $z'=0.75$, and $z'=1$.

It can be seen that up to 50% of the total height, the maximum thickness is offset towards the trailing edge in the vane of the invention compared with the other vane (the leading edge and the trailing edge being respectively at 0% and at 100% of the chord).

Figure 7:
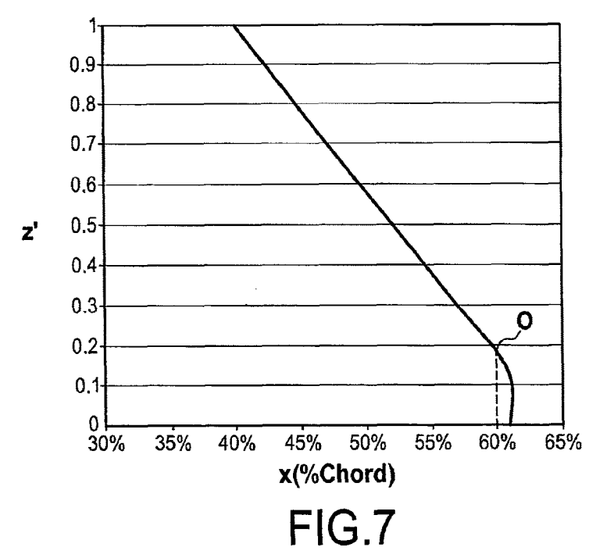
FIG. 7 shows how the position of the maximum thickness relative to the chord varies along the height of the vane, for a vane of the invention.

FIG. 7 shows that for $z'=0$, the position of the maximum thickness is greater than 60% of the chord, and more precisely it is about 62% of the chord. The position of the maximum thickness remains substantially at a value greater than 60% of the chord up to $z'=0.15$, or indeed in practice up to $z'=0.2$. Over this fraction going from $z'=0$ to $z'=0.15$ or indeed $z'=0.20$, the position of maximum thickness remains substantially constant, e.g. remaining within variation of about 5% of the chord. Specifically, the position of the maximum thickness remains between 60% and 65% of the chord up to $z'=0.15$.

Over a second fraction that extends beyond this first fraction, going towards the tip of the vane, the position of the maximum thickness advances towards the leading edge with increasing height along the vane, with this continuing to the tip. Over this second fraction, the position of maximum thickness advances progressively towards the leading edge with increasing $z'$, and specifically it reaches about 40% to 45% of the chord at the tip of the vane ($z'=1$).

Figure 9:
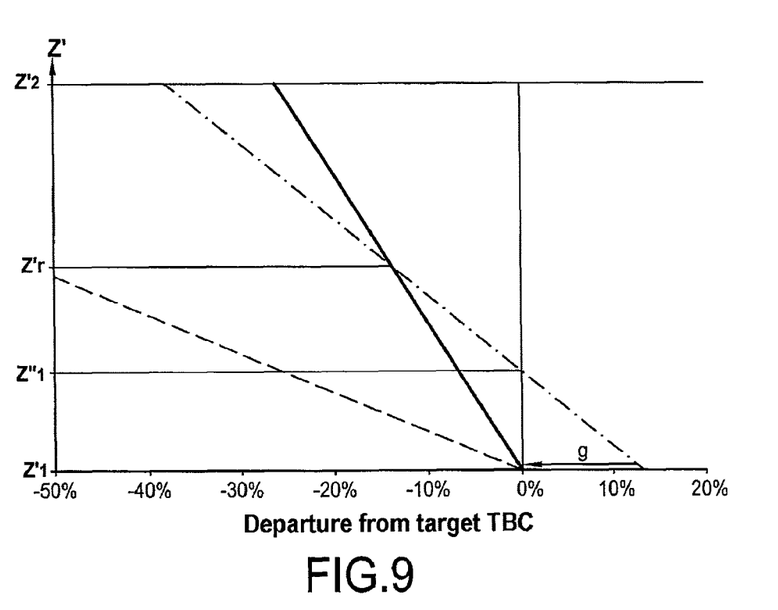
FIG. 9 shows how the TBC parameter departs from the target TBC parameter as a fraction of height along the vane for a segment of the total height having dimensionless coordinates z' lying between values z'1 and z'2, both for the vane of the invention (continuous lines) and for two other vanes (discontinuous lines).

In FIG. 9, the departure from the target TBC parameter is plotted along the abscissa axis, while the $z'$ coordinate is plotted up the ordinate axis. The target TBC parameter is the origin of the abscissa axis (value 0%), and the variation in the departure of the TBC parameter from the target TBC parameter as a function of height is given for a representative fraction of the vane, between values $z'1$ and $z'2$ of the $z'$ coordinate.

The regular discontinuous line shows the variation of the departure of the observed TBC parameter from the target TBC parameter for a prior art vane having a straight stack. This departure is acceptable since it is negative over the entire fraction under consideration.

The chain-dotted line shows the departure of the TBC parameter for a forwardly projecting vane, as defined above, but without modifying the positions of the maximum thicknesses, i.e. while conserving the same distances as on the above-described vane between the leading edge and the maximum thickness positions for each section of the vane. It can be seen that the departure is unacceptable between the values $z'1$ and $z''1$, since they become positive in this fraction: the TBC parameter is degraded.

The continuous-line curve shows the departure of the TBC parameter for a vane of the invention for which, over its bottom portion (up to $z'=0.5$), not only does its leading edge project forwards, but also the positions of maximum thickness are offset from the leading edge by at least 50% of the chord. It can be seen that for this vane, the departure of the TBC parameter is once more acceptable, since it remains negative over the fraction under consideration.

For the value $z'1$ that is situated between the root of the vane and a value $z'r$, which corresponds specifically to a middle value between $z'1$ and $z'2$, there can be seen an improvement g corresponding to the improvement between the observed TBC parameter and the target TBC parameter. Depending on circumstances, this improvement may be about 10% of the TBC departure.

FIG. 9 relates to a representative fraction of the height of vane over which compliance with the TBC criterion is judged to be important. The reference value $z'r$ corresponds substantially to the half-height of the vane furthest from the vane root, as fastened to the inner casing 28, and the tip of the vane as fastened to the outer casing 10. The representative fraction from $z'1$ to $z'2$ may for example cover 10% to 40% of the height of the vane.

Furthermore, the inventors have observed that the vane for which the TBC departure is shown by the continuous line in FIG. 9 presents the same variation in aerodynamic losses as illustrated by the continuous line in FIG. 8. Thus, by combining the setback in the positions of maximum thickness to at least 50% of the chord over the bottom portion of the vane ($z'$ lying in the range 0 to 0.5) with causing the leading edge to project forwards ($x'$ coordinate less than or equal to 0), a vane is provided that presents aerodynamic performance that is improved and for which the TBC criterion is preserved.

The invention claimed is:

1. A guide vane for a set of guide vanes of a turbine engine the guide vane comprising a plurality of vane sections stacked between a root and a tip along a radial axis Z that defines the height direction of the vane, each vane section:
    extending along a longitudinal axis X between a leading edge and a trailing edge, and along a tangential axis Y between a pressure side face and a suction side face;
    having a chord defined by the length of the segment extending from the leading edge to the trailing edge; and
    having a thickness defined by the distance between the pressure side and suction side faces that varies along the chord;
    dimensionless coordinates $x'$ and $z'$ being defined for each point of the vane of coordinates x, y, and z along the axes X, Y, and Z by the quotients x/Ht and z/Ht, where Ht represents the total height of the vane, the leading edge of the vane at its total height Ht defining a coordinate at the origin $x'=0$ from which the coordinate $x'$ increases going towards the trailing edge;
    wherein over a bottom portion of the vane extending from $z'=0$ to $z'=0.5$, the coordinate $x'$ of the leading edge is negative and the maximum thicknesses are located at positions that are offset from the leading edge by at least 50% of the chord,
    wherein the coordinate $x'$ increases continuously from the root, passes through a value of zero at about ⅔ of the height of the vane and reaches a maximum positive value at a position located in a range from 80% to 90% of the total height, prior to decreasing and returning to zero at 100% of the maximum height.

2. The vane as claimed in claim 1, wherein for the section of coordinate $z'=0$, the coordinate $x'$ is less than or equal to −0.15.

3. The vane as claimed in claim 1, wherein over a portion of the vane extending from $z'=0$ to $z'=0.3$, the coordinate $x'$ is less than or equal to −0.1.

4. The vane as claimed in claim 2, wherein over a portion of the vane extending from $z'=0$ to $z'=0.3$, the coordinate $x'$ is less than or equal to −0.1.

5. The vane as claimed in claim 1, wherein the coordinate $x'$ increases continuously over the bottom portion of the vane with increasing coordinate $z'$.

6. The vane as claimed in claim 2, wherein the coordinate $x'$ increases continuously over the bottom portion of the vane with increasing coordinate $z'$.

7. The vane as claimed in claim 3, wherein the coordinate $x'$ increases continuously over the bottom portion of the vane with increasing coordinate $z'$.

8. The vane as claimed in claim 4, wherein the coordinate $x'$ increases continuously over the bottom portion of the vane with increasing coordinate $z'$.

9. The vane as claimed in claim 1, wherein for the section of coordinate $z'=0$, the maximum thickness is located at a position offset from the leading edge by at least 60% of the chord.

10. The vane as claimed in claim 2, wherein for the section of coordinate $z'=0$, the maximum thickness is located at a position offset from the leading edge by at least 60% of the chord.

11. The vane as claimed in claim 3, wherein for the section of coordinate $z'=0$, the maximum thickness is located at a position offset from the leading edge by at least 60% of the chord.

12. The vane as claimed in claim 9, wherein over a portion of the vane extending in the range $z'=0$ to $z'=0.15$, the maximum thickness is located at a position that is offset from the leading edge by at least 60% of the chord.

13. The vane as claimed in claim 1, wherein the vane presents a first portion extending from $z'=0$ to $z'=0.20$, over which the position of the maximum thickness relative to the chord remains substantially constant, and a second portion extending beyond the first portion to the tip of the vane, over which the position of the maximum thickness advances towards the leading edge.

14. An annular set of outlet guide vanes for a turbine engine comprising a plurality of vanes as claimed in claim 1.

15. A turbine engine including at least one OGV set according to claim 14.

* * * * *